United States Patent
Zhang et al.

(10) Patent No.: US 10,992,988 B2
(45) Date of Patent: Apr. 27, 2021

(54) METHOD, SYSTEM, AND INTELLIGENT TERMINAL FOR DISTRIBUTING RANDOM DATA

(71) Applicant: Beijing Dajia Internet Information Technology Co.,Ltd., Beijing (CN)

(72) Inventors: Yang Zhang, Beijing (CN); Zhidong Lang, Beijing (CN); Siyu Liu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/906,751

(22) Filed: Jun. 19, 2020

(65) Prior Publication Data

US 2020/0322683 A1 Oct. 8, 2020

Related U.S. Application Data

(63) Continuation of application No. PCT/CN2018/117457, filed on Nov. 26, 2018.

(30) Foreign Application Priority Data

Dec. 20, 2017 (CN) .......................... 201711385520.9

(51) Int. Cl.
*H04N 21/466* (2011.01)
*H04N 21/2187* (2011.01)
(Continued)

(52) U.S. Cl.
CPC ..... *H04N 21/4667* (2013.01); *H04N 21/2187* (2013.01); *H04N 21/2625* (2013.01);
(Continued)

(58) Field of Classification Search
CPC .. G06Q 20/065; G06Q 20/00; G06Q 20/3224; G06Q 30/02; H04L 65/40;
(Continued)

(56) References Cited

U.S. PATENT DOCUMENTS

2015/0172281 A1  6/2015  Joshi et al.

FOREIGN PATENT DOCUMENTS

| CN | 105389117 A | * | 3/2016 |
| CN | 105389117 A | | 3/2016 |

(Continued)

OTHER PUBLICATIONS

First Office Action and partial translation from Chinese Application No. CN201711385520.9, which was filed on Dec. 20, 2017.
(Continued)

*Primary Examiner* — Omar S Parra
(74) *Attorney, Agent, or Firm* — Burns & Levinson, LLP; Joseph M. Maraia

(57) ABSTRACT

The present application disclose a method, system, and an intelligent terminal for distributing random data. The method comprises the following steps: obtaining a user instruction to be executed; generating data to be shared based on the user instruction, wherein the data to be shared is conditioned on a delay; detecting whether an ended condition of the delay is fulfilled; and receiving a first request for accessing the data to be shared in response to that the ended condition is fulfilled.

15 Claims, 7 Drawing Sheets

(51) Int. Cl.
*H04N 21/262* (2011.01)
*H04N 21/442* (2011.01)
*H04N 21/4627* (2011.01)
*H04N 21/472* (2011.01)

(52) U.S. Cl.
CPC ... *H04N 21/44222* (2013.01); *H04N 21/4627* (2013.01); *H04N 21/472* (2013.01)

(58) Field of Classification Search
CPC .............. H04L 65/602; H04N 21/2187; H04N 21/2625; H04N 21/44222; H04N 21/4627; H04N 21/4667; H04N 21/472; H04N 21/4788; H04N 21/4884; G06F 16/29; G06K 9/00671; G06T 19/006; G06T 19/20; G06T 2219/2004; H04M 1/72544
See application file for complete search history.

(56) References Cited

FOREIGN PATENT DOCUMENTS

| | | |
|---|---|---|
| CN | 105741091 A | 7/2016 |
| CN | 105933759 A | 9/2016 |
| CN | 106203989 A | 12/2016 |
| CN | 106327164 A | 1/2017 |
| CN | 106851346 A | 6/2017 |
| CN | 108123945 A | 6/2018 |

OTHER PUBLICATIONS

Second Office Action and partial translation from Chinese Application No. CN201711385520.9, which was filed on Dec. 20, 2017.
Notification of Grant and partial translation from Chinese Application No. CN201711385520.9, which was filed on Dec. 20, 2017.

* cited by examiner

METHOD, SYSTEM, AND INTELLIGENT TERMINAL FOR DISTRIBUTING RANDOM DATA

CROSS REFERENCE TO RELATED APPLICATIONS

The present application is a continuation of International Application No. PCT/CN2018/117457, filed on Nov. 26, 2018, which claims the priority to Chinese Patent Application No. 201711385520.9, filed with the China National Intellectual Property Administration on Dec. 20, 2017, both of which are hereby incorporated by reference in their entireties.

FIELD OF INVENTION

The embodiments of the present application relate to the field of live broadcast, and in particular to a method, a system, and an intelligent terminal for distributing random data.

BACKGROUND

With the development of network technologies, the network live broadcast has become an emerging sunrise industry. The live broadcast specifically is "a broadcasting mode in which the post-synthesis and broadcast of the broadcasting and TV programs are performed simultaneously". According to broadcast occasions, it may be divided into live broadcast at the scene, live broadcast in the telestudio, live broadcast in the studio and other forms. The TV live broadcast is a broadcasting mode in which the TV program is produced and broadcasted simultaneously on the spot with the occurrence and development of the event, and is a broadcasting mode that fully reflects the communication advantages of the broadcast television media. How to attract the audiences by using the shared data is to be studied.

BRIEF SUMMARY

The embodiments of the present application provide a method and system, and an intelligent terminal for distributing random data, which are capable of setting the delay for sharing.

An embodiment of the present application provides a method for distributing random data, including:
obtaining a user instruction to be executed;
generating data to be shared based on the user instruction, wherein the data to be shared is conditioned on a delay;
detecting whether an ended condition of the delay is fulfilled;
receiving a first request for accessing the data to be shared in response to that the ended condition is fulfilled;
obtaining an audience number of online audiences at the current moment based on the user instruction;
calculating one or more pre-selected data traffics corresponding to the audience number based on the audience number;
placing the pre-selected data traffics at a preset position of a container for user to select;
counting online durations of online audiences;
comparing the online durations with a preset first time threshold; and
authorizing data permissions of the audiences for accessing the data to be shared in response to that the online duration is greater than or equal to the preset first time threshold.

According to the embodiment, the generating the data to be shared includes:
obtaining a clicking instruction;
generating the data to be shared corresponding to the pre-selected data traffic based on the clicking instruction; and
determining a delay time as an initiating time of the data to be shared.

According to the embodiment, the method further includes:
obtaining time information of the current moment in real time, and comparing the time information with the initiating time; and
initiating the data to be shared in response to that the time information is same as the initiating time.

According to the embodiment, the container includes: a first display area of data and a second display area of data, wherein the second display area is larger than the first display area;
the initiating the data to be shared includes:
displaying the data to be shared from the first display area to the second display area in response to that the time information is same as the initiating time.

According to the embodiment, the method further includes:
obtaining audience information of grabbed traffic and traffic information of grabbed data;
generating barrage information of data based on the audience information and the traffic information; and
displaying the barrage information in the container.

According to the embodiment, the method further includes:
obtaining audience information of grabbed traffic and traffic information of grabbed data;
sorting audiences who have grabbed data in a descending exponential order based on a size of data traffic in the traffic information; and
displaying the audience information in a preset ranking range and the traffic information in the second display area.

According to the embodiment, the method further includes:
obtaining the number of a first audiences, wherein the first audiences do not grab data to be shared;
calculating the number of actual people online based on the number of first audiences and the number of online audiences; and
calculating one or more pre-selected data traffics based on the number of actual people online in a new round of data distribution.

An embodiment of the present application further provide a system for distributing random data, including: one or more processor, and a memory, wherein the memory stores application programs, and the processor reads and executes the programs in the memory to:
obtain a user instruction to be executed;
generate data to be shared based on the user instruction, wherein the data to be shared is conditioned on a delay;
detect whether an ended condition of the delay is fulfilled;
receive a first request for accessing the data to be shared in response to that the ended condition is fulfilled;
obtain an audience number of online audiences at the current moment based on the user instruction;
calculate one or more pre-selected data traffics corresponding to the audience number based on the audience number;
place the pre-selected data traffics at a preset position of a container for user to select;

count online durations of online audiences;

compare the online durations with a preset first time threshold; and authorize data permissions of the audiences for accessing the data to be shared in response to that the online duration is greater than or equal to the preset first time threshold.

According to the embodiment, the processors are further configured to:

obtain a clicking instruction;

generate the data to be shared corresponding to the pre-selected data traffic based on the clicking instruction; and determine a delay time as an initiating time of the data to be shared.

According to the embodiment, the processors are further configured to:

obtain time information of the current moment in real time, and comparing the time information with the initiating time; and initiate the data to be shared in response to that the time information is same as the initiating time.

According to the embodiment, the container includes: a first display area of data and a second display area of data, wherein the second display area is larger than the first display area; and the processors are further configured to display the data to be shared from the first display area to the second display area in response to that the time information is same as the initiating time.

According to the embodiment, the processors are further configured to:

obtain audience information of grabbed traffic and traffic information of grabbed data;

generate barrage information of data based on the audience information and the traffic information; and display the barrage information in the container.

According to the embodiment, the processors are further configured to:

obtain audience information of grabbed traffic and traffic information of grabbed data;

sorting audiences who have grabbed data in a descending exponential order based on a size of data traffic in the traffic information; and display the audience information in a preset ranking range and the traffic information in the second display area.

According to the embodiment, the processors are further configured to:

obtain the number of a first audiences, wherein the first audiences do not grab data to be shared;

calculate the number of actual people online based on the number of first audiences and the number of online audiences; and calculate one or more pre-selected data traffics based on the number of actual people online in a new round of data distribution.

An embodiment of the present application further provides an intelligent terminal, including:

one or more processors;

a memory; and one or more application programs, wherein the application programs are stored in the memory and configured to be executed by the processors, and the programs are configured to:

obtain a user instruction to be executed;

generate data to be shared based on the user instruction, wherein the data to be shared is conditioned on a delay;

detect whether an ended condition of the delay is fulfilled;

receive a first request for accessing the data to be shared in response to that the ended condition is fulfilled;

obtain an audience number of online audiences at the current moment based on the user instruction;

calculate one or more pre-selected data traffics corresponding to the audience number based on the audience number;

place the pre-selected data traffics at a preset position of a container for user to select;

count online durations of online audiences;

compare the online durations with a preset first time threshold; and authorize data permissions of the audiences for accessing the data to be shared in response to that the online duration is greater than or equal to the preset first time threshold.

BRIEF DESCRIPTION OF THE DRAWINGS

In order to illustrate the embodiments of the present application and the technical solutions in the prior art more clearly, the accompanying figures which need to be used in describing the embodiments and the prior art will be introduced below briefly. Obviously the accompanying figures described below are some embodiments of the present application, and other accompanying figures can also be obtained by those ordinary skilled in the art according to these accompanying figures without creative labor.

DETAILED DESCRIPTION OF THE EMBODIMENTS

In order to enable those skilled in the art to better understand the technical solutions of the present application, the technical solutions in the embodiments of the present application will be described clearly and completely with reference to the accompanying drawings in the embodiments of the present application.

Some processes described in the specification and claims of the present application and the above drawings include multiple operations appearing in a particular order, but it should be clearly understood that these operations may not be performed in the order appearing herein or may be performed in parallel. The order numbers of operations such as 101 and 102 are only used to distinguish different operations, and the order number itself does not represent any execution sequence. In addition, these processes may include more or fewer operations, and these operations may be performed sequentially or in parallel. It should be noted that the terms such as "first", "second" and the like herein are used to distinguish different messages, devices, modules, etc., do not represent the sequence, and do not limit "first" and "second" as different types either.

The technical solutions in the embodiments of the present application will be described clearly and completely below in combination with the accompanying drawings in the embodiments of the present application. Obviously the described embodiments are only a part of the embodiments of the present application but not all the embodiments. Based upon the embodiments of the present application, all of other embodiments obtained by those skilled in the art without creative work pertain to the protection scope of the present application.

Embodiments

The method for distributing random data in some embodiments is applicable to: the fixed live broadcast room and the live broadcast service operation server with PCs (Personal Computers) being clients, and the mobile live broadcast room and the live broadcast service operation server with intelligent mobile terminals being clients.

Figure 1:
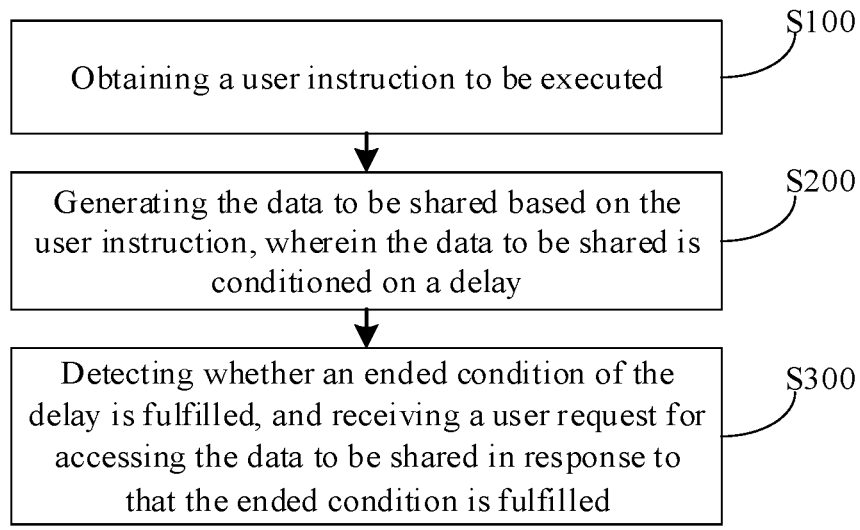
FIG. 1 is a schematic diagram of a basic flow of a method for distributing random data of an embodiment of the present application.

Please refer to FIG. 1, which is a schematic diagram of a basic flow of a method for distributing random data in this embodiment.

S100: obtaining a user instruction to be executed.

The intelligent mobile terminal generates the user instruction to be executed by acquiring a clicking instruction, wherein the user instruction may be a sharing instruction for red envelopes. Then, the server may obtain the user instruction to be executed from the intelligent mobile terminal.

S200: generating data to be shared based on the user instruction, wherein the data to be shared is conditioned on a delay.

After receiving the user instruction, the server may trigger the operation of setting the delay, thereby generating the data to be shared conditioned on the delay, wherein the countdown time for accessing the data to be shared is started after the delay is set. In response to that the countdown time becomes zero, the data to be shared can be accessed, otherwise it cannot be accessed.

S300: detecting whether an ended condition of the delay is fulfilled, and receiving a first request for accessing the data to be shared in response to that the ended condition is fulfilled.

When the countdown time returns to zero, the server receives the audience online's request for accessing the data to be shared, divides the data to be shared into multiple pieces of random data, and then starts to randomly distribute the multiple pieces of random data to the clients of the audiences.

By setting the delay when the data to be shared is generated, the online audiences can access the data only when the ended condition of the delay is fulfilled, so that the user can realize the demand of attracting and increasing the popularity and improving the audience stability by means of the data to be shared.

In some embodiments, the data to be shared can be red envelopes, data red envelopes, or several electronic tickets.

In some embodiments, the method for sharing data is illustrated by taking the red envelope as an example. In the following embodiments, the data to be shared specifically refers to a red envelope, and the traffic refers to the specific amount of the red envelope.

Figure 2:
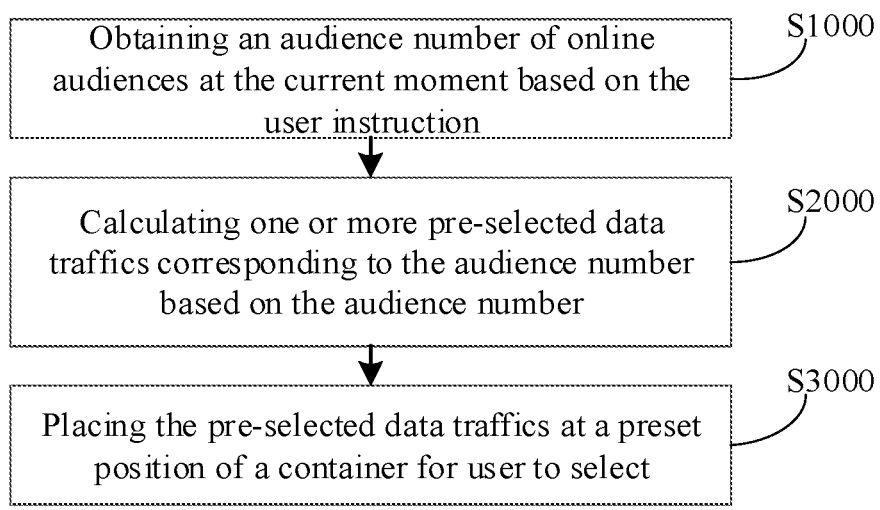
FIG. 2 is a flow schematic diagram of an embodiment of a method for distributing random data of an embodiment of the present application.

Please refer to FIG. 2, which is a flow schematic diagram of an embodiment of a method for distributing random data in this embodiment.

As shown in FIG. 2, a method for distributing random data is provided. After the step of obtaining the user instruction to be executed, and before the step of generating the data to be shared based on the user instruction, the method for distributing random data may further include the following steps.

S1000: obtaining an audience number of online audiences at the current moment based on the user instruction.

After receiving a red envelope instruction initiated by an anchor, a client reads the number of current audiences in the live broadcast room in the client's memory. Of course, it may also initiate a request to the server to obtain the number of current audiences in the live broadcast room. In this way, after obtaining the user instruction to be executed and before generating the data to be shared based on the user instruction, the server may count the number of current audiences in the live broadcast room, and send the number of current audiences in the live broadcast room to the client after counting the number of current audiences in the live broadcast room.

S2000: calculating one or more pre-selected data traffics corresponding to the audience number based on the audience number.

After counting the number of current audiences in the live broadcast room, the server may calculate one or more pre-selected amounts of red envelopes corresponding to the number of current audiences by substituting the obtained number of audiences into the preset calculation rule.

The calculation rule includes: the amount of the red envelope per capita of the audience. For example, the calculation rule is that the amount of the red envelope per audience is 0.5 yuan. When the number of current audiences is 600, the calculated pre-selected amount of red envelopes is 300 yuan. When the amounts of the red envelope per capita are divided by level, there are also multiple pre-selected amounts of red envelopes. For example, when the amounts of the red envelope per capita are 0.5, 1.0 and 1.5 yuan and the number of current audiences is 600, the calculated pre-selected amounts of red envelopes are 300, 600 and 900 yuan, and the anchor can choose one of the three pre-selected amounts of red envelopes according to his own needs.

In some embodiments, the calculation rule is determined according to the value interval of the number of current audiences. For example, when the number of audiences is 0-200, the pre-selected amounts of red envelopes are 100, 200 and 500 yuan; the number of audiences is 200-500, the pre-selected amounts of red envelopes are 200, 500 and 1000 yuan; when the number of audiences is 500-1000, the pre-selected amounts of red envelopes are 500, 1000 and 2000 yuan; when the number of audiences is 1000-5000, the pre-selected amounts of red envelopes are 1000, 2000 and 5000 yuan; when the number of audiences is greater than 5000, the pre-selected amounts of red envelopes is 2000, 5000 and 10000 yuan. The value interval into which the number of current audiences falls is determined, and the pre-selected amounts of red envelopes corresponding to the corresponding interval are acquired.

S3000: placing the pre-selected data traffics at a preset position of a container for user to select.

The container refers to the content displayed in the display area of the client, and also refers to the data content stored in the video memory space of the client.

After determining the specific values of the pre-selected amounts of red envelopes, the values are set in a preset template container (display pattern of the pre-selected amounts of red envelopes), and then displayed in the display area of the client for the anchor to select and confirm the amount.

The pre-selected amount is placed in the middle of the display area, which is convenient for users to read, but not limited to this. In some embodiments, the pre-selected amount of red envelopes can be placed anywhere in the display area according to different specific application scenarios, where the selection criteria is: it can be convenient for users to browse and operate. For example: in the live broadcast environment, in order not to obstruct the live broadcast scene of the user's display area, the pre-selected amount of red envelopes is placed in the comment area or the barrage area for display.

In the above embodiments, the server reads the number of audiences in the live broadcast room of the anchor, and calculates, according to the amount of the red envelope per capita corresponding to the number of audiences or the calculation rule of the value interval of the red envelope corresponding to the number of audiences, the pre-selected amounts of red envelopes sent by the anchor in the current live broadcast room for the anchor to choose. Since the number of red envelopes is set according to the number of audiences, it is in real time, and the number of red envelopes can be set reasonably to meet the demands of different levels of anchors, so that they can achieve the demands of using red envelopes to increase the popularity and audience stability. At the same time, since the amount of red envelopes is calculated according to the current online audiences, the anchor can only set the amount freely within a limited range, avoiding the problem that the anchor deceives the popularity through small amount of red envelopes and affects the balance of the live broadcast platform.

When distributing red envelopes in the live broadcast room, different anchors distribute red envelopes at different times. Some audiences may wander in different live broadcast rooms to pursue the benefits of red envelopes, and wait for opportunities to look for the live broadcast room distributing red envelopes, so that there are a large number of audiences in the live broadcast room when the red envelopes are distributed, but the audiences break up a hubbub after the red envelopes have been grabbed, causing disorder of the live broadcast order and also harming the interests of the anchors.

In order to solve the above technical problem, an embodiment of the present application provides a method of regularly issuing red envelopes. For details, please refer to FIG. 3, which is a schematic diagram of a basic flow of regularly issuing red envelopes in this embodiment.

Figure 3:
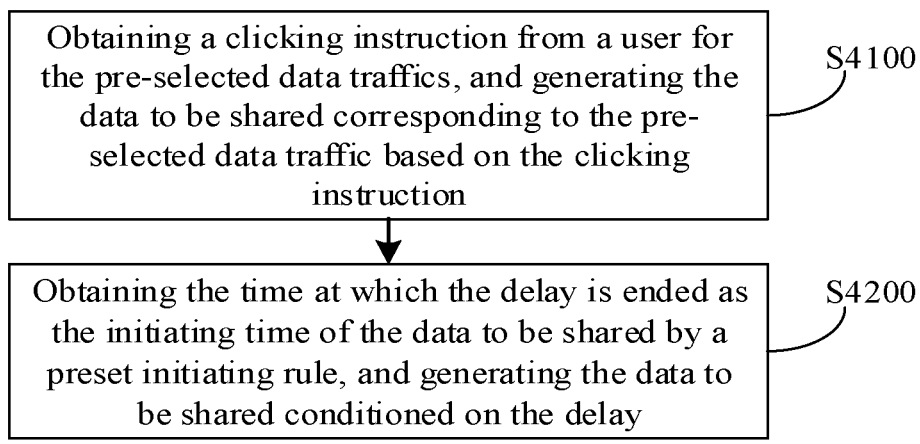
FIG. 3 is a schematic diagram of a basic flow of regularly distributing red envelopes of an embodiment of the present application.

As shown in FIG. 3, the above step of generating the data to be shared based on the user instruction may include the following steps.

S4100: obtaining a clicking instruction from a user for the pre-selected data traffics, and generating the data to be shared corresponding to the pre-selected data traffic based on the clicking instruction.

After the pre-selected amounts are placed in the display area of the client, the user's clicking instruction is accepted, the amount of red envelopes selected by the user is confirmed, and then a red envelope to be opened is generated and simultaneously the amount of corresponding value is deducted from the anchor account.

S4200: obtaining the time at which the delay is ended as the initiating time of the data to be shared by a preset initiating rule, and generating the data to be shared conditioned on the delay.

The initiating time rule of the red envelope set is preset, and when the anchor confirms that the red envelope is generated, the red envelope is sent to the server, and the audience can know that the anchor has issued the red envelope by refreshing the data content (a red envelope pattern will appear in the display area of the live broadcast room), but the red envelope is set to be initiated after a delay.

The initiating rule refers to the delayed initiating time of the red envelope. In some embodiments, the limited initiating rule is: acquiring a nearby integer moment as the initiating time of the red envelope to be opened. For example: an anchor determines that the time of sending a red envelope is 10:05, and the integer moment close to this moment is 10:10, so the delay set for the red envelope is 5 minutes, and the red envelope can only be initiated after 5 minutes after it is sent. If an anchor determines that the time of sending a red envelope is 14:21:36, and the integer moment close to this moment is 14:30:00, so the delay set for the red envelope is 8 minutes and 24 seconds.

An application scenario in this embodiment is to define all the red envelopes of the anchors of the live broadcast platform to be initiated at a uniform integer moment. For example, an anchor can send out one red envelope every ten minutes, and the initiating time of the red envelope is the next integer moment after the anchor sends out the red envelope. After reaching the initiating time of the red envelopes, all the red envelopes in the platform are initiated at the same time, and the audiences in each live broadcast room can receive the red envelopes in this live broadcast room or a few live broadcast rooms, avoiding the problem of abnormal audience flow caused by the random distribution of red envelopes.

In some embodiments, the initiating time of the red envelope can be set by the anchor. For details, please refer to FIG. 4, which is a schematic diagram of a basic flow of a method of setting the time to initiate the red envelope in this embodiment.

Figure 4:
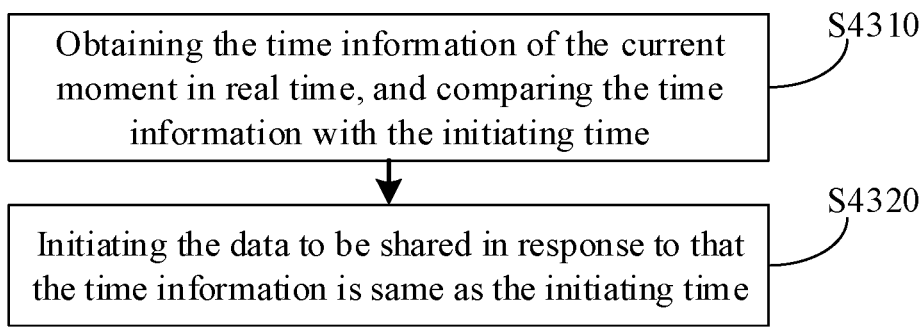
FIG. 4 is a schematic diagram of a basic flow of a method for setting the time to initiate red envelopes of an embodiment of the present application.

As shown in FIG. 4, the above step of detecting whether the ended condition of the delay is fulfilled and receiving a first request of accessing the data to be shared when the ended condition is fulfilled may include the steps of:

S4310: obtaining the time information of the current moment in real time, and comparing the time information with the initiating time.

When distributing a red envelope, the anchor selects the specific time of initiating the red envelope. It should be pointed out that the initiating moment selected by the anchor must be an integer moment, and the minite time of the initiating time of the red envelope is an integer multiple of 10.

After the anchor selects the initiating time, the server obtains the client's time information in real time and compares the time information with the initiating time.

S4320: initiating the data to be shared in response to that the time information is same as the initiating time.

When the time information is the same as the initiating time, the client may send the request information for initiating the red envelope to the server. At this time, the server may receive the request information for opening the red envelope sent by the client. Moreover, after receiving the request information, the server initiates the red envelope, and the grabbing for red envelopes can be started.

In some embodiments, the red envelope will be displayed at the anchor client and the client of the audience after distribution, where the specific display mode is as below.

S4330: displaying the data to be shared from the first display area to the second display area in response to that the time information is same as the initiating time.

Figure 5:
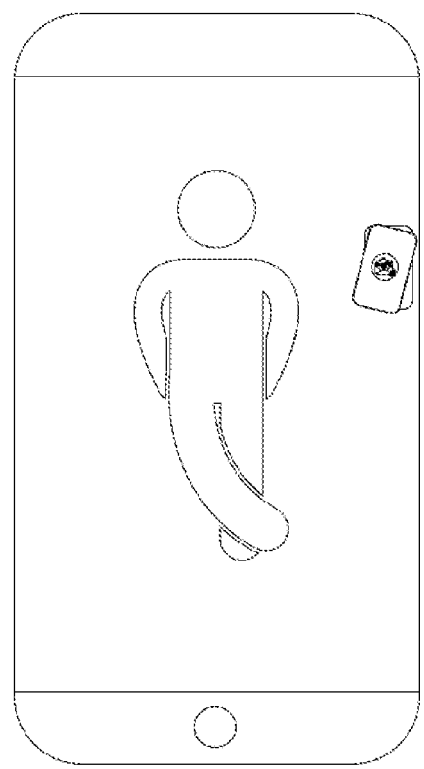
FIG. 5 is a schematic diagram of a first display form of the red envelope of an embodiment of the present application.
Figure 6:
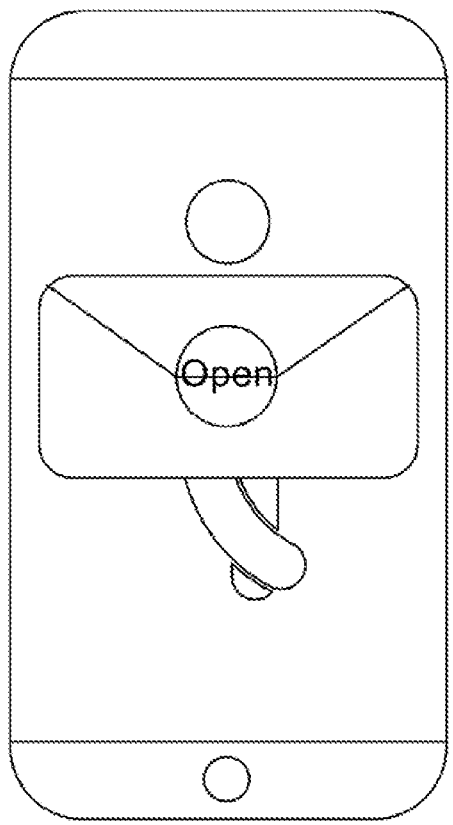
FIG. 6 is a schematic diagram of a second display form of the red envelope of an embodiment of the present application.

Specifically, please refer to FIG. 5 and FIG. 6. FIG. 5 is a schematic diagram of a first display form of the red envelope in this embodiment; and FIG. 6 is a schematic diagram of a second display form of the red envelope in this embodiment.

As shown in FIG. 5, when the red envelope is in the to-be-initiated state, the red envelope pattern is placed in the first display area of the display area, where the first display area of the red envelope is located in the middle of the right side of the display area, and the area of the first display area of the red envelope is relatively small, so as not to unduly obstruct the anchor or audience watching the live broadcast scene. However, the placement of the first display area of the red envelope is not limited thereto. In some embodiments, the first display area of the red envelope can be placed at any position in the display area according to different application scenarios, where the selection criterion is to reduce the blocking of the live broadcast information by the first red envelope display area as much as possible, and to be capable of setting the position of the first red envelope display area according to the specific application environment.

As shown in FIG. 6, when the red envelope is in the initiating state, the red envelope pattern is placed in the second display area of which the area is larger than that of the first display area of the red envelope, so that the audience or anchor can grab the red envelope in time. The second display area of the red envelope is located in the middle of the display area.

After the audience grabs the red envelope, the red envelope grabbed by the audience needs to be displayed. For details, please refer to FIG. 7, which is a flow schematic diagram of a first method of showing the red envelope amount in this embodiment.

Figure 7:
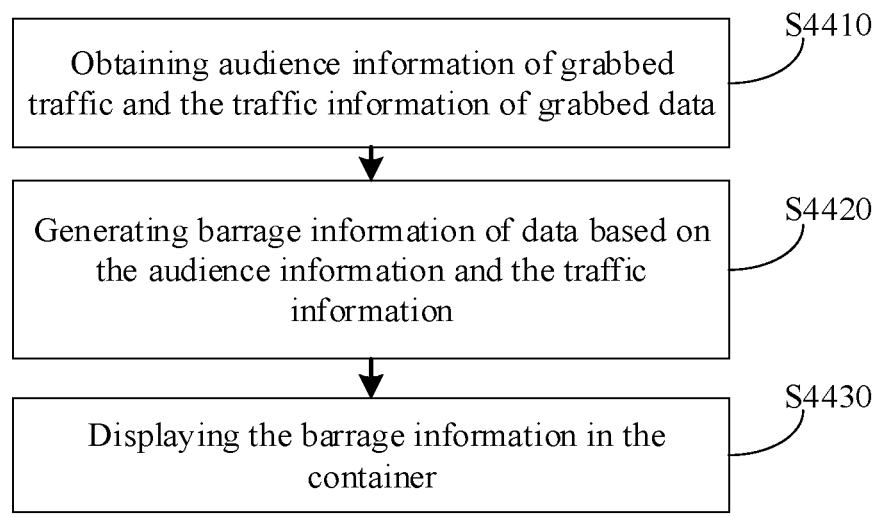
FIG. 7 is a flow schematic diagram of a first method for showing the red envelope amount of an embodiment of the present application.

As shown in FIG. 7, after the step S4330, the following steps are included:

S4410: obtaining audience information of grabbed traffic and the traffic information of grabbed data.

After the audience participates in grabbing the red envelope, the server stores the request information of grabbing the red envelope sent by the audience client and the amount of the red envelope randomly obtained by the audience, and extracts the audience's user name and the amount of the grabbed red envelope from the above information.

S4420: generating barrage information of data based on the audience information and the traffic information.

The information of the audience who has grabbed the red envelope and the red envelope amount are edited. The preset red envelope information editing rule is used during editing. For example, XXX gets the red envelope XXX. In the preset edit information, the user name is added at the prefix position, and the red envelope amount is added at the suffix position. In this way, the information barrages of red envelopes are generated quickly and uniformly.

S4430: displaying the barrage information in the container.

After generating the barrages, the server displays the barrages in the barrage area in their generating order, and then sends the edited barrage information to the client of the anchor and the client of the audience for displaying the barrages.

Figure 8:
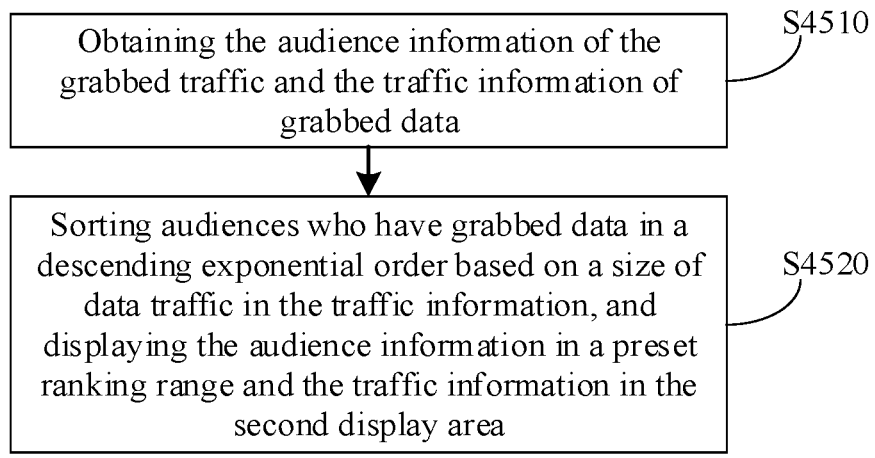
FIG. 8 is a flow schematic diagram of a second method for showing the red envelope amount of an embodiment of the present application.

After the audiences grab the red envelopes, it is necessary to highlight a part of audiences. For details, please refer to FIG. 8, which is a flow schematic diagram of a second method of showing the amount of the red envelope in this embodiment.

S4510: obtaining the audience information of the grabbed traffic and the traffic information of grabbed data.

After the audience participates in grabbing the red envelope, the server stores the request information of grabbing the red envelope sent by the client of the audience and the amount of the red envelope randomly obtained by the audience, and extracts the audience's user name and the amount of the grabbed red envelope from the above information.

S4520: sorting audiences who have grabbed data in a descending exponential order based on a size of data traffic in the traffic information, and displaying the audience information in a preset ranking range and the traffic information in the second display area.

The server stores the audience information of the grabbed red envelopes and the amounts of the grabbed red envelopes, arranges the user names of the audiences in a descending exponential order based the amounts of the grabbed red envelopes, extracts the user names and the amounts of the red envelopes of the top five audiences, and sends the extracted information to the client of the anchor and the client of the audience. After receiving the information, the client of the anchor and the client of the audience display it in the second red envelope display area.

In some application scenarios, some users belong to zombie audiences who increase the popularity of the live broadcast room by on-hook. If the zombie audiences are also included in the calculation of the amount of the red envelope, the number of red envelopes in the live broadcast room is often greater than the number of actual online audiences. When the number of zombie audiences is far greater than the number of actual online audiences, the imbalance of the distribution of red envelopes may be caused, and a large number of unclaimed red envelopes may harm the interests of online audiences.

In order to solve the above technical problem, the embodiment of the present application provides a method of calculating the number of actual people online. For details, please refer to FIG. 9, which is a flow schematic diagram of a method of calculating the number of actual online audiences in this embodiment.

Figure 9:
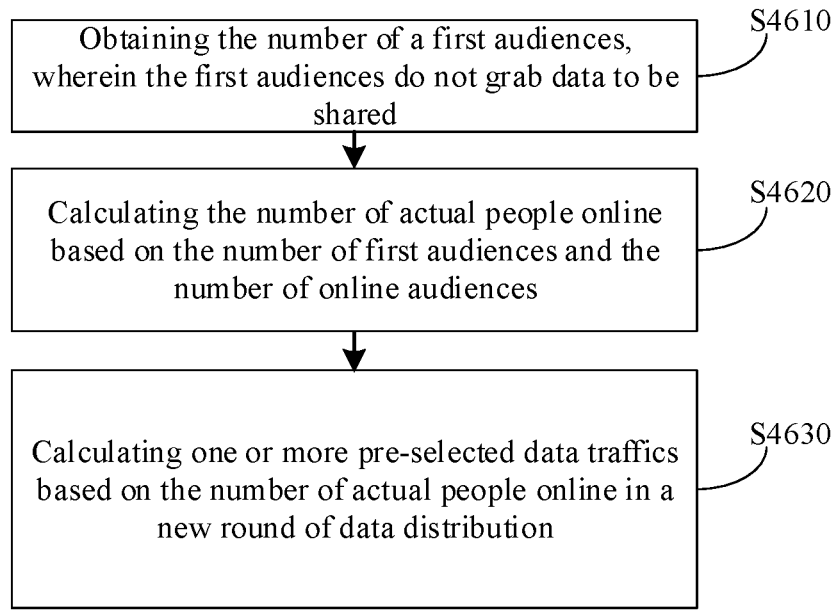
FIG. 9 is a flow schematic diagram of a method for calculating the number of actual online audiences of an embodiment of the present application.

As shown in FIG. 9, after the step S3000, the following steps are further included herein.

S4610: obtaining the number of a first audiences, wherein the first audiences do not grab data to be shared.

After the grabbing for red envelopes is over, the server counts the number of audiences in the live broadcast room and the number of actual online audiences grabbing the red envelopes. The number of audiences who did not grab red envelopes is calculated.

S4620: calculating the number of actual people online based on the number of first audiences and the number of online audiences.

The number of audiences who did not grab red envelopes is calculated based on the number of audiences in the live broadcast room and the number of actual online audiences grabbing the red envelopes.

S4630: calculating one or more pre-selected data traffics based on the number of actual people online in a new round of data distribution.

When the anchor distributes a new round of red envelope, the obtained number of actual people online is substituted into the preset calculation rule to calculate the pre-selected amount of red envelopes corresponding to the number of actual people online.

By analyzing the data on the number of people who grabbed red envelopes in the previous round, the loyal audiences with high activity in the live broadcast room are obtained, so that the red envelopes of the anchor are positioned and distributed accurately, which protects the interests of the anchor and also guarantees the interests of the audiences.

In some implementations, in order to further ensure the interests of the anchor and prevent some audiences from the mobile grabbing for red envelopes in various live broadcast rooms to pursue their own interests, this embodiment further provides a method of limiting the grabbing for red envelopes. For details, please refer to FIG. 10, which is a flow schematic diagram of a method of limiting the grabbing for red envelopes in this embodiment.

Figure 10:
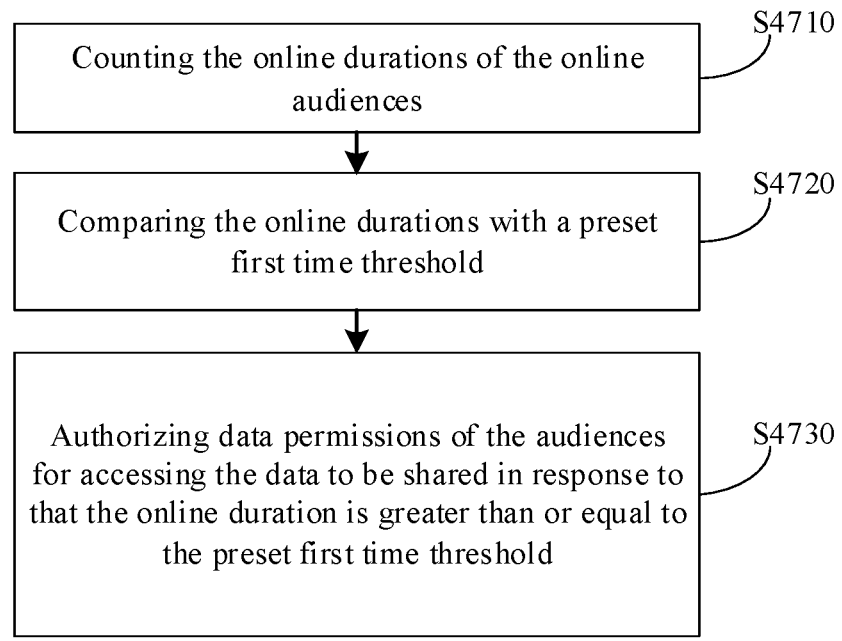
FIG. 10 is a flow schematic diagram of a method for limiting the grabbing for red envelopes of an embodiment of the present application.

As shown in FIG. 10, after the step S3000, the following steps are further included herein.

S4710: counting the online durations of the online audiences.

The server counts the online duration of each audience in the live broadcast room. The specific method is: when the time at which the audience sends an access request through the client is recorded and a timer is started. The time during which a disconnection request sent by this audience client is not received is the online time of the audience.

S4720: comparing the online durations with a preset first time threshold.

The obtained online duration of the audience is compared with the first red envelope threshold duration, where the first red envelope threshold duration is a set duration threshold, and usually the set value is 10 minutes. But it is not limited thereto. In some embodiments, the first red envelope threshold duration can be (but not limited to): 1, 5, 15 minutes, or longer or shorter duration.

S4730: authorizing data permissions of the audiences for accessing the data to be shared in response to that the online duration is greater than or equal to the preset first time threshold.

When the online duration of the audience is greater than or equal to the first red envelope threshold duration, the server authorizes permission to open the red envelope to the user terminal of the audience, so that the audience can grab the red envelope through the client at the initiating moment of the red envelope. When the online duration of the audience is less than the first red envelope threshold duration, the server locks permission to grab the red envelope to the user terminal. After the permission is locked, the audience sends a grabbing request to the server when grabbing the red envelope. The server verifies the permission on the information, and rejects the request sent by the terminal on which the permission is not authorized, so that the client cannot grab the red envelope.

The authorizing or unauthorizing the permission to grab the red envelope to the audience client by limiting the audience's online time ensures the loyalty of the audiences grabbing the red envelope in the live broadcast room, and thus ensures the interests of the anchor and the health of the red envelope distribution in the live broadcast.

Figure 11:
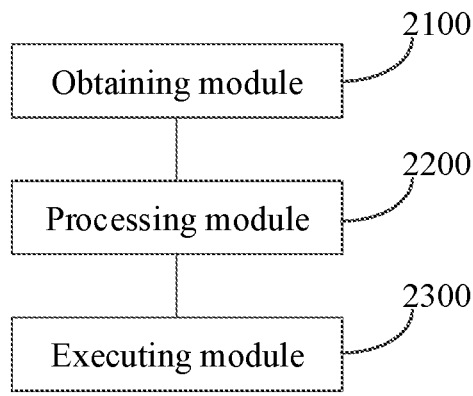
FIG. 11 is a schematic diagram of a basic structure of a system for distributing random data of an embodiment of the present application.

For details, please refer to FIG. 11, which is a schematic diagram of a basic structure of a system for distributing random data in this embodiment.

As shown in FIG. 11, a system for distributing random data includes: an obtaining module 2100, a processing module 2200, and an executing module 2300, wherein the obtaining module 2100 is configured to obtain a user instruction to be executed; the processing module 200 is configured to generate data to be shared based on the user instruction, wherein the data to be shared is conditioned on a delay; and the executing module 2300 is configured to detect whether an ended condition of the delay is fulfilled; and receive a first request for accessing the data to be shared in response to that the ended condition is fulfilled.

By setting the delay when the data to be shared is generated, the online audiences can access the data only when the ended condition of the delay is fulfilled, so that the user can realize the demand of attracting and increasing the popularity and improving the audience stability by means of the data to be shared.

In some embodiments, the system for distributing random data further includes: a first obtaining submodule, a first processing submodule, and a first execution submodule, wherein the first obtaining submodule is configured to obtain an audience number of online audiences at the current moment based on the user instruction, after said obtaining the user instruction to be executed, and before said generating data to be shared based on the user instruction; the first processing submodule is configured to calculate one or more pre-selected data traffics corresponding to the audience number based on a preset calculation rule with the audience number as a parameter; and the first execution submodule is configured to place the pre-selected data traffics at a preset position of a container for user to select.

In some embodiments, the processing module includes: a second obtaining submodule and a second execution submodule, wherein the second obtaining submodule is configured to obtain a clicking instruction from a user on the pre-selected data traffics, and generate data to be shared corresponding to the pre-selected data traffic based on the clicking instruction; and the second execution submodule is configured to obtain delay time based on a preset initiating rule as initiating time of the data to be shared, and generate the data to be shared conditioned on the delay.

In some embodiments, the executing module includes: a first comparison submodule and a first share submodule, wherein the first comparison submodule is configured to obtain time information of the current moment in real time, and comparing the time information with the initiating time; and the first share submodule is configured to initiate the data to be shared in response to that the time information is same as the initiating time.

In some embodiments, the container includes: a first display area of data and a second display area of data, wherein the second display area is larger than the first display area; and the first share submodule includes: a first switching submodule configured to switch a pattern of the data to be shared from the first display area to the second display area for display in response to that the time information is same as the initiating time.

In some embodiments, the system for distributing random data further includes: a third obtaining submodule, a first editing submodule, and a first display submodule, wherein the third obtaining submodule is configured to obtain audience information of grabbed traffic and traffic information of grabbed data, after said switching the pattern of the data to be shared from the first display area to the second display area for display in response to that the time information is same as the initiating time; the first editing submodule is configured to form barrage information of data, by editing the audience information of the grabbed traffic and the traffic information of the grabbed data by a preset editing rule; and the first display submodule is configured to display the barrage information of data in the container.

In some embodiments, the system for distributing random data further includes: a fourth obtaining submodule and a second display submodule, wherein the fourth obtaining submodule is configured to obtain audience information of grabbed traffic and traffic information of grabbed data, after said switching the pattern of the data to be shared from the first display area to the second display area for display in response to that the time information is same as the initiating time; and the second display submodule is configured to arrange audiences who have grabbed data in a descending exponential order based on a size of data traffic in the traffic information, and display audience information of audiences in a preset ranking range and traffic information of grabbed data in the second display area.

In some embodiments, the system for distributing random data further includes: a fifth obtaining submodule, a first calculation submodule, and a third execution submodule, wherein the fifth obtaining submodule is configured to obtain the number of audiences who do not grab data in the online audiences, after said placing the pre-selected data traffics at the preset position of the container for user to select; the first calculation submodule is configured to calculate the number of actual people online based on the number of audiences who do not grab data and the number of online audiences at the current moment; and the third execution submodule is configured to calculate one or more pre-selected data traffics of the number of audiences corresponding to the number of actual people online in a new round of data distribution, based on the preset calculation rule with the number of actual people online as the parameter.

In some embodiments, the system for distributing random data further includes: a first counting submodule, a second comparison submodule, and a fourth execution submodule, wherein the first counting submodule is configured to count online durations of the online audiences at the current moment, after said placing the pre-selected data traffics at the preset position of the container for user to select; the second comparison submodule is configured to compare an online duration of each audience online at the current moment with a preset first time threshold; and the fourth execution submodule is configured to authorize data permissions to the audience online at the current moment whose online duration is greater than or equal to the preset first time threshold, so that the audience online whose online duration is greater than or equal to the preset first time threshold has an authorization to access the data to be shared.

This embodiment further provides an intelligent terminal. For details, please refer to FIG. 12, which is a schematic diagram of a basic structure of an intelligent terminal in this embodiment.

It should be noted that in some embodiments, the memory 1520 of the intelligent terminal stores all the programs used to implement the method for distributing random data in some embodiments, and the processor 1580 can invoke the programs in the memory 1520 to execute all the functions listed in the method for distributing random data described above. Since the functions implemented by the intelligent terminal have been described in detail in the method for distributing random data in some embodiments, the detailed description thereof will be omitted here.

Figure 12:
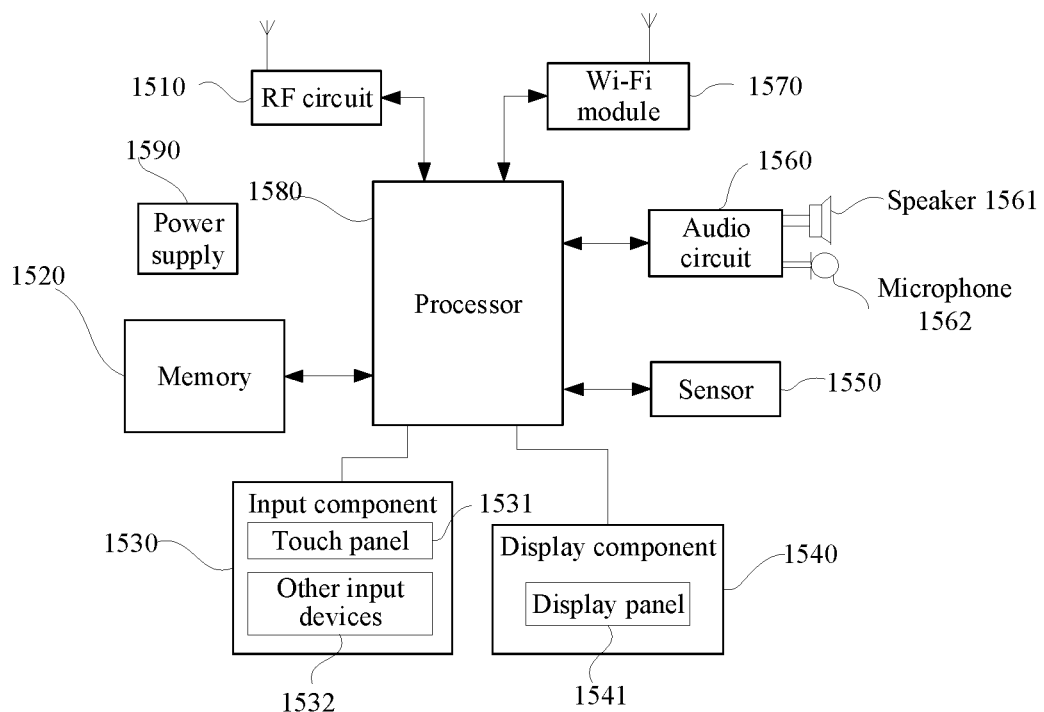
FIG. 12 is a block diagram of a basic structure of an intelligent terminal of an embodiment of the present application.

An embodiment of the present application further provides a intelligent terminal. As shown in FIG. 12, for ease of description, only parts related to the embodiment of the present application are shown. For specific technical details not disclosed, please refer to the method section of the embodiments of the present application. The terminal may be a intelligent terminal, a tablet computer, a PDA (Personal Digital Assistant), a POS (Point of Sales), a vehicle-carried computer, or any terminal device. Take the terminal being a intelligent terminal as an example:

FIG. 12 is a block diagram of a partial structure of a intelligent terminal related to a terminal provided by an embodiment of the present application. Referring to FIG. 12, the intelligent terminal includes: a Radio Frequency (RF) circuit 1510, a memory 1520, an input component 1530, a display component 1540, a sensor 1550, an audio circuit 1560, a Wireless Fidelity (Wi-Fi) module 1570, a processor 1580, a power supply 1590 and other components. Those skilled in the art may understand that the structure of the intelligent terminal shown in FIG. 7 does not constitute a limitation on the intelligent terminal, and more or fewer components than those illustrated may be included, or certain components may be combined, or different component arrangements may be used.

Various components of the intelligent terminal will be specifically introduced below with reference to FIG. 12:

The RF circuit 1510 may be used to receive and send signals in the process of receiving and sending the information or in the call process, and particularly, after receiving the downlink information of the base station, to give it to the processor 1580 for processing; and in addition, send the designed uplink data to the base station. Generally, the RF circuit 1510 includes but not limited to an antenna, at least one amplifier, a transceiver, a coupler, a Low Noise Amplifier (LNA), a duplexer, and the like. Furthermore, the RF circuit 1510 may further communicate with networks and other devices through wireless communication. The above wireless communication may use any communication standard or protocol, including but not limited to: Global System of Mobile Communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), etc.

The memory 1520 may be used to store software programs and modules, and the processor 1580 performs various functional applications and data processing of the intelligent terminal by running the software programs and modules stored in the memory 1520. The memory 1520 may mainly include a program storage area and a data storage area, wherein the program storage area may store the operating system, the applications required by at least one function (such as voiceprint play function, image play function, etc.), and the like; and the data storage area may store the data (such as audio data, phone book, etc.) created according to the use of the intelligent terminal, and the like. Furthermore, the memory 1520 may include a high speed random access memory, and may further include a non-volatile memory, e.g., at least one magnetic disk storage device, flash memory device, or other volatile solid-state storage device.

The input component 1530 may be used to receive the input number or character information, and generate the signal input related to the user settings and functional controls of the intelligent terminal. Specifically, the input component 1530 may include a touch panel 1531 and other input devices 1532. The touch panel 1531, also called touch screen, may collect the touch operations of the user on or near it (for example, the operations of the user using any suitable object or accessory such as finger or touch pen on or near the touch panel 1531), and drive the corresponding connection apparatus according to the preset program. Optionally, the touch panel 1531 may include two parts: a touch detection device and a touch controller, wherein the touch detection device detects the touch orientation of the user, detects the signal generated from the touch operation, and transmits the signal to the touch controller; and the touch controller receives the touch information from the touch detection device, converts it into the contact coordinates and then sends them to the processor 1580, and can receive and execute the commands sent by the processor 1580. Furthermore, the touch panel 1531 may be implemented in various types, such as resistance type, capacitive type, infrared, surface acoustic wave and others. In addition to the touch panel 1531, the input component 1530 may further include other input devices 1532. Specifically, other input devices 1532 may include but not limited to one or more of physical keyboard, function key (such as volume control key, switch key, etc.), trackball, mouse, joystick and the like.

The display component 1540 may be used to display the information input by the user or the information provided to the user and various menus of the intelligent terminal. The display component 1540 may include a display panel 1541, and optionally, the display panel 1541 may be configured in the form of Liquid Crystal Display (LCD), Organic Light-Emitting Diode (OLED) or the like. Further, the touch panel 1531 may cover the display panel 1541. When the touch panel 1531 detects a touch operation on or near it, it transmits the touch operation to the processor 1580 to determine the type of touch event, and then the processor 1580 provides the corresponding visual output on the display panel 1541 according to the type of the touch event. In FIG. 7, the touch panel 1531 and the display panel 1541 as two independent components realize the input and output functions of the intelligent terminal, but in some embodiments, the touch panel 1531 and the display panel 1541 may be integrated to realize the input and output functions of the intelligent terminal.

The intelligent terminal may further include at least one sensor 1550, such as a light sensor, a motion sensor, and other sensors. Specifically, the light sensor may include an ambient light sensor and a proximity sensor, wherein the ambient light sensor may adjust the brightness of the display panel 1541 according to the light and shade of the ambient light, and the proximity sensor may close the display panel 1541 and/or backlight when the smart mobile terminal moves to the ear. As a type of motion sensor, the accelerometer sensor may detect the magnitudes of the accelerations in all directions (generally three axes), may detect the magnitude and direction of the gravity when it is stationary, and may be used to identify the applications of the intelligent terminal gestures (such as horizontal and vertical screen switching, related game, magnetometer gesture calibration) and identify the related functions by vibration (such as pedometer, tap), etc.; as for the gyroscope, barometer, hygrometer, thermometer, infrared sensor and other sensors that may be configured in the intelligent terminal, the detailed description thereof will be omitted here.

The audio circuit 1560, the speaker 1561 and the microphone 1562 may provide audio interfaces between the user and the intelligent terminal. The audio circuit 1560 may convert the received audio data into an electrical signal and transmit it to the speaker 1561, and the speaker 1561 converts it into a voiceprint signal for outputting; and on the other hand, the microphone 1562 converts the collected voiceprint signal into an electrical signal; the audio circuit 1560 receives the electrical signal and converts it into the audio data, and then outputs the audio data to the processor 1580 for processing; and then the processor 1580 sends the audio data to for example another intelligent terminal via the RF circuit 1510, or outputs the audio data to the memory 1520 for further processing.

The Wi-Fi belongs to the short-range wireless transmission technology, and the intelligent terminal may help the user to receive and send the e-mails, browse the web pages, access the streaming media and the like through the Wi-Fi module 1570 which provides the user with the wireless broadband Internet access. Although FIG. 7 shows the Wi-Fi module 1570, it can be understood that it is not a necessary component of the intelligent terminal, and can be omitted as needed without changing the essential scope of the application.

The processor 1580 is the control center of the intelligent terminal, uses various interfaces and lines to connect various parts of the entire intelligent terminal, and executes various functions and process data of the intelligent terminal by running or executing the software programs and/or modules stored in memory 1520 and invoking the data stored in memory 1520, so as to monitor the entire intelligent terminal. Optionally, the processor 1580 may include one or more processors; preferably, the processor 1580 may integrate an application processor and a modem processor, wherein the application processor mainly processes the operating system, user interface and application programs, etc., and the modem processor mainly processes the wireless communications. It can be understood that the foregoing modem processor may not be integrated into the processor 1580.

The intelligent terminal further includes a power supply 1590 (such as a battery) that supplies power to various components. Preferably, the power supply may be logically connected to the processor 1580 through the power management system, so as to realize functions such as charging, discharging, and power management through the power management system.

Although not shown, the intelligent terminal may further include a camera, a bluetooth module, etc., which will not be repeated here.

An embodiment of the present application further provides a computer readable storage medium for storing a computer program, which is run by a processor to perform: any method for distributing random data described above.

An embodiment of the present application further provides a computer program product, which is configured, when being run, to perform: any method for distributing random data described above.

For the embodiments of the computer readable storage medium and the computer program product, they are substantially similar to the method embodiments, so the description thereof is relatively simple, and the related parts may refer to the partial illustration of the method embodiments.

It should be noted that the specification of the present application and its drawings give the preferred embodiments of the present application, but the present application may be implemented in many different forms, and is not limited to the embodiments described in the specification. These embodiments are not intended as additional limitations on the content of the present application, and the purpose of providing these embodiments is to understand the disclosure of the present application more thoroughly and comprehensively. In addition, the above technical features continue to be combined with each other to form various embodiments not listed above, which are regarded to be in the scope of the specification of the present application; further, those ordinary skill in the art may make the improvements or changes according to the above description, and all these improvements and changes shall fall within the protection scope of the claims appended to the present application.

What is claimed is:

1. A method for distributing random data, comprises:
obtaining a user instruction to be executed;
generating data to be shared based on the user instruction, wherein the data to be shared is conditioned on a delay;
detecting whether an ended condition of the delay is fulfilled;
receiving a first request for accessing the data to be shared in response to that the ended condition is fulfilled;
obtaining an audience number of online audiences at the current moment based on the user instruction;
calculating one or more pre-selected data traffics corresponding to the audience number based on the audience number;
placing the pre-selected data traffics at a preset position of a container for user to select;
counting online durations of online audiences;
comparing the online durations with a preset first time threshold; and
authorizing data permissions of the audiences for accessing the data to be shared in response to that the online duration is greater than or equal to the preset first time threshold.

2. The method according to claim 1, said generating the data to be shared comprises:
obtaining a clicking instruction;
generating the data to be shared corresponding to the pre-selected data traffic based on the clicking instruction; and
determining a delay time as an initiating time of the data to be shared.

3. The method according to claim 2, further comprising:
obtaining time information of the current moment in real time, and comparing the time information with the initiating time; and
initiating the data to be shared in response to that the time information is same as the initiating time.

4. The method according to claim 3, wherein the container comprises:
first display area of data and a second display area of data, wherein the second display area is larger than the first display area;
said initiating the data to he shared comprises:
displaying the data. to be shared from the first display area to the second display area in response to that the time information is same as the initiating time.

5. The method according to claim 4, further comprising:
obtaining audience information of grabbed traffic and traffic information of grabbed data;
generating barrage information of data based on the audience information and the traffic information; and
displaying the barrage information in the container.

6. The method according to claim 4, further comprising:
obtaining audience information of grabbed traffic and traffic information of grabbed data;
sorting audiences who have grabbed data in a descending exponential order based on a size of data traffic in the traffic information; and
displaying the audience information in a preset ranking range and the traffic information in the second display area.

7. The method according to claim 1, further comprising:
obtaining the number of a first audiences, wherein the first audiences do not grab data to be shared;
calculating the number of actual people online based on the number of first audiences and the number of online audiences; and
calculating one or more pre-selected data traffics based on the number of actual people online in a new round of data distribution.

8. A system for distributing random data, comprising:
one or more processors and a memory, wherein the memory is configured to store application programs. and the processors are configured to read and execute the programs in the memory to:
obtain a user instruction to be executed;
generate data to be shared based on the user instruction, wherein the data to be shared is conditioned on a delay;
detect whether an ended condition of the delay is fulfilled;
receive a first request for accessing the data to be shared in response to that the ended condition is fulfilled;
obtain an audience number of online audiences at the current moment based on the user instruction;
calculate one or more pre-selected data traffics corresponding to the audience number based on the audience number;
place the pre-selected data traffics at a preset position of a container for user to select;
count online durations of online audiences;
compare the online durations with a preset first time threshold; and
authorize data permissions of the audiences for accessing the data to be shared in response to that the online duration is greater than or equal to the preset first time threshold.

9. The system according to claim 8, wherein the processors are further configured to:
obtain a clicking instruction;
generate the data to be shared corresponding to the pre-selected data traffic based on the clicking instruction; and
determine a delay time as an initiating time of the data to be shared.

10. The system according to claim 9, wherein the processors are further configured to:
obtain time information of the current moment in real time, and comparing the time information with the initiating time; and
initiate the data to be shared in response to that the time information is same as the initiating time.

11. The system according to claim 10, wherein the container comprises:
a first display area of data and a second display area of data, wherein the second display area is larger than the first display area; and
wherein the processors are further configured to display the data to be shared from the first display area to the second display area in response to that the time information is same as the initiating time.

12. The system according to claim 11, wherein the processors are further configured to:

obtain audience information of grabbed traffic and traffic information of grabbed data;

generate barrage information of data based on the audience information and the traffic information; and display the barrage information in the container.

13. The system according to claim 11, wherein the processors are further configured to:

obtain audience information of grabbed traffic and traffic information of grabbed data;

sort audiences who have grabbed data in a descending exponential order based on a size of data traffic in the traffic information; and display the audience information in a preset ranking range and the traffic information in the second display area.

14. The system according to claim 8, wherein the processors are further configured to:

obtain the number of a first audiences, wherein the first audiences do not grab data to be shared;

calculate the number of actual people online based on the number of first audiences and the number of online audiences; and calculate one or more pre-selected data traffics based on the number of actual people online in a new round of data distribution.

15. An intelligent terminal, comprising:

one or more processors;

a memory; and one or more application programs, wherein the application programs are stored in the memory and configured to be executed by the processors, and the programs are configured to:

obtain a user instruction to be executed;

generate data to be shared based on the user instruction, wherein the data to be shared is conditioned on a delay;

detect whether an ended condition of the delay is fulfilled;

receive a first request for accessing the data to be shared in response to that the ended condition is fulfilled;

obtain an audience number of online audiences at the current moment based on the user instruction;

calculate one or more pre-selected data traffics corresponding to the audience number based on the audience number;

place the pre-selected data traffics at a preset position of a container for user to select;

count online durations of online audiences;

compare the online durations with a preset first time threshold; and authorize data permissions of the audiences for accessing the data to be shared in response to that the online duration is greater than or equal to the preset first time threshold.

* * * * *